United States Patent [19]

Saito et al.

[11] Patent Number: 4,665,606

[45] Date of Patent: May 19, 1987

[54] METHOD FOR MANUFACTURING A SEAT

[75] Inventors: Fumitaka Saito; Hiroko Isabe, both of Akishima, Japan

[73] Assignee: Tachikawa Spring Co., Ltd., Tokyo, Japan

[21] Appl. No.: 798,379

[22] Filed: Nov. 15, 1985

[30] Foreign Application Priority Data

Nov. 30, 1984 [JP] Japan ................... 59-253180

[51] Int. Cl.⁴ ................... B23P 11/02; A47C 27/00
[52] U.S. Cl. ................... 29/448; 297/DIG. 1; 297/224
[58] Field of Search ............ 296/63; 297/DIG. 1, 297/223–229; 29/446–447, 448

[56] References Cited

U.S. PATENT DOCUMENTS

| 3,643,308 | 2/1972 | Yamamoto | 297/DIG. 1 |
| 4,232,898 | 11/1980 | Bodero | 297/224 |
| 4,400,030 | 8/1983 | Maruzzo et al. | 297/224 |
| 4,534,595 | 8/1985 | Abe et al. | 297/DIG. 1 |

Primary Examiner—Howard N. Goldberg
Assistant Examiner—Steven Nichols
Attorney, Agent, or Firm—Cushman, Darby & Cushman

[57] ABSTRACT

A method for manufacturing a seat for use in an automobile, airplane and the like is disclosed which comprises the steps: knitting at least two kinds of synthetic fibers respectively having different average heat setting temperatures to form a bag-shaped trim cover assembly of a size suitable for covering a pad of foam material; covering the foam pad with the thus-formed trim cover assembly; and then heat-setting both the trim cover assembly and the pad at temperatures necessary for the trim cover assembly to shrink sufficiently so that the trim cover assembly can be brought into close contact with the surface of the pad.

4 Claims, 4 Drawing Figures

METHOD FOR MANUFACTURING A SEAT

BACKGROUND OF THE INVENTION

1. Field of the Invention

The present invention relates to a method for manufacturing a seat for use in an automobile and the like and, more particularly, to an industrially advantageous method for manufacturing a seat which is mainly composed of a pad of foam material and a trim cover assembly for covering the pad and is conveniently used in an automobile and the like.

2. Description of the Prior Art

Conventionally, the above-mentioned type of method for manufacturing a seat requires a process of producing a trim cover assembly in which sheet material is used or cut into piece members having forms corresponding to the respective side surface configurations of a pad, and these piece members are then sewn together into a bag-like configuration which is suitable for covering the pad.

Accordingly, in the above-mentioned conventional seat manufacturing method, the process of producing the trim cover assembly not only requires a large number of steps such as a cutting step, a sewing step and the like, but also incurs a cutting loss of the sheet material, resulting in an expensive trim cover assembly and thus an expensive vehicle seat. In addition, the prior art manufacturing method is found disadvantageous in that it is not suitable for speedy mass production.

In order to eliminate the drawbacks found in the above-mentioned manufacturing method, there is a good reason for change of the manufacturing method of the trim cover assembly from by means of sewing to by means of knitting.

However, in general, knitted goods have a larger percentage of elongation and thus, when used as a trim cover assembly, they may be loosened to produce wrinkles thereon, which fails to provide a sufficient close contact with its associated pad. It is true that the close contact problem can be solved by using fibers of high stretching properties such as polyurethane fibers (e.g., Spandex) and the like, but such highly-stretching fibers are expensive and very poor in weatherability. Therefore, when they are employed as the trim cover assembly of the vehicle seat which is to be used for longer periods of time, they can deteriorate and thus reduce their own performances.

SUMMARY OF THE INVENTION

In view of the above-mentioned prior art circumstances, the inventors have made many examinations on various kinds of knitted stuff and found that knitted stuff formed of a combination of synthetic fibers having different heat-set temperatures can provide an excellent contact relative to uneven configurations and also can be heat set.

The invention is completed on the basis of the above-mentioned knowledge and, accordingly, it is a primary object of the invention to provide an industrially advantageous method for manufacturing a seat, which employs knitting technique in producing a trim cover assembly of the seat.

When manufacturing a seat mainly composed of a foam pad and a trim cover assembly for covering the pad, the above-mentioned object can be accomplished by a seat manufacturing method which comprises the steps: knitting at least 2 kinds of synthetic fibers having different average heat-set temperatures into a trim cover assembly having a bag-like configuration of a size suitable for covering the pad; inserting and disposing the above-mentioned pad into the thus-formed bag-like trim cover assembly; and, heat setting the trim cover assembly and the pad integrally at temperatures necessary for the trim cover assembly to shrink enough.

Other objects and advantages of the invention will become apparent during the following detailed description in connection with the accompanying drawings and the novelty thereof pointed out in the appended claims.

DETAILED DESCRIPTION OF A PREFERRED EMBODIMENT OF THE INVENTION

Figure 1:
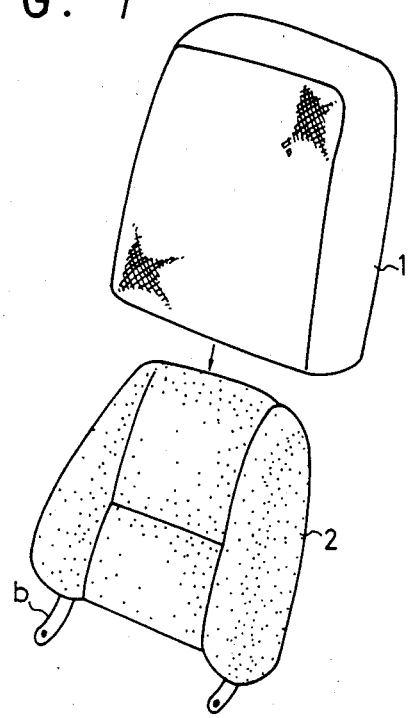
FIGS. 1 and 2 are respectively general views to illustrate an embodiment of the invention.

First, in the manufacturing method of the invention, a bag-shaped trim cover assembly is knitted out, which is designated by (1) in the drawings.

The knitting of the bag-shaped trim cover assembly must be carried out using at least two kinds of synthetic fibers having different average heat set temperatures. Heat setting is a well-known processing technique which makes use of the thermoplasticity of synthetic fibers to heat-treat textile goods so as to fix the status thereof.

The heat setting causes the fibers to shrink and the percentage of shrinkage depends on fibers. A heat setting temperature is not a constant value itself, but a value indicating a range of temperatures within which a certain fiber can shrink. Therefore, the heat setting temperature is given as an average value. In the present method, it is preferred that two or more synthetic fibers having heat setting temperatures which are different 50° C. or more from each other are combined for use. Specially preferred combinations are those of the first group with the second group shown in Table 1.

TABLE 1

|   | Name of Fibers | Heat Setting Temperatures (°C.) |
|---|---|---|
| I | Acryl | 140–160 |
|   | Polyester | 180–220 |
|   | Nylon | 180–220 |
| II | Satin | 80–120 |
|   | Polypropylene | 80–90 |
|   | Vinyl Chloride | <80 |

The first group in Table 1 contains fibers which have higher average heat setting temperatures, while the second group in Table 1 contains fibers of lower average heat setting temperatures. Normally, a first fiber is selected out of the first group and a second fiber is selected out of the second group, that is, the thus-selected two fibers are combined with each other. In some cases, however, three or more fibers may be selected and combined according to demand.

It is preferred that the amount of use of the fiber(s) of higher average heat setting temperature(s) with respect to the fiber(s) of lower average heat setting temperature(s) is 65–95% by weight.

The bag-shaped trim cover assembly (1) according to the invention, as described before, is knitted out using a combination of two or more kinds of fibers having different average heat setting temperatures. In combining thereof, the respective fibers may be mixedly intertwined, or, alternatively, the fibers may be put in order and then knitted. The knitting operation of the trim cover assembly (1) is carried out by a knitting machine. The trim cover assembly (1), in the present invention, must be formed so as to have dimensions suitable for covering a pad (2) formed of foam material. In other words, the bag-like trim cover assembly (1) is formed of its required parts such as a body portion, side cover portions, hem portions, welt portions and the like into an integral unit of a size suitable for the solid or three-dimensional configuration of the pad (2). According to the invention, the pad (2) is inserted into and disposed within the thus-knitted bag-like trim cover assembly (1) in such a manner as shown in FIG. 1, and then both of them are integrally heat set to provide a seat.

Figure 2:
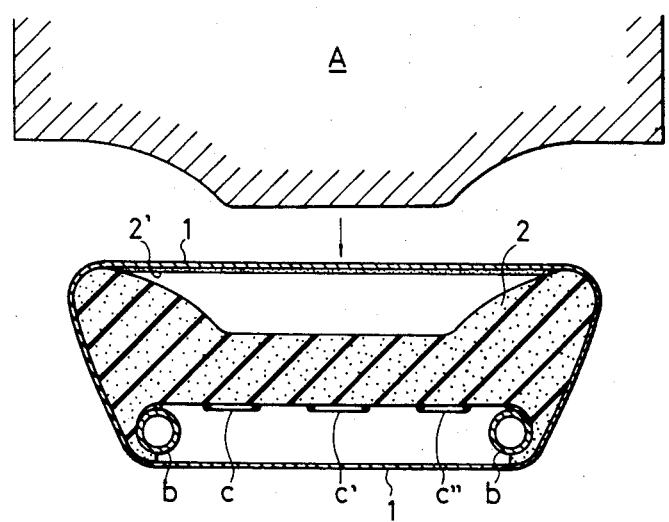

The above-mentioned heat setting, as shown in FIG. 2, is carried out by pressing a heater (A) against the bag-like trim cover assembly (1), similarly to a well-known prior art method. The heater (A) shown in FIG. 2 is adapted to have a configuration suitable for the undulations of the pad (2). When the heater (A) is lowered down, the bag-like trim cover assembly (1) is pressed by the lowered heater (A) so that the trim cover assembly (1) can be heat set integrally with the pad (2).

In FIG. 2, reference characters (b)(b') respectively designate frames, (c)(c')(c'') represent springs, respectively, while numeral (2') stands for a reinforcing sheet, adhesive sheet or the like which can be selectively used according to demand.

The above-mentioned heat setting temperatures are temperatures necessary to cause the bag-shaped trim cover assembly (1) to shrink sufficiently, and, as the heat setting temperatures, the temperatures on the order of the temperatures of the fibers having the higher average heat setting temperatures may be employed, although this is not always true since the heat setting temperatures differ according to the kinds of the fibers. In the combinations of the fibers shown in Table 1 mentioned above, the range of 150°–250° C. is optimum. Also, the time for heat setting may be conveniently selected or determined in consideration of the shrinkage, close contact condition and the like of the bag-shaped trim cover assembly (1). It should be noted that the heat setting may be performed by dry heating or wet heating to provide the same results.

Figure 4:
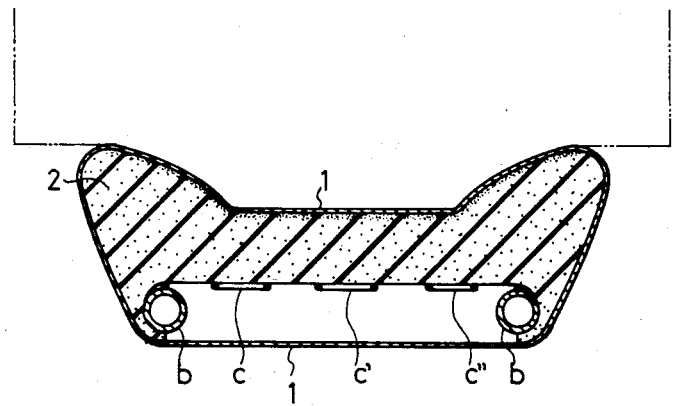

The bag-like trim cover assembly (1) can be brought into sufficiently close contact with the pad (2) and thus can be fixed integrally therewith, as shown in FIG. 4.

Figure 3:
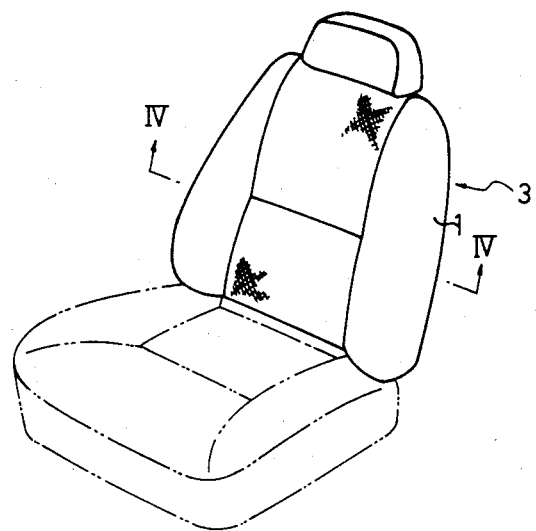
FIG. 3 is a perspective view of a seat constructed in accordance with the invention; and, FIG. 4 is a section view taken along line IX—IX in FIG. 3.

In FIG. 3, there is illustrated a seat (3) according to the invention. Since it is constructed in the above-mentioned manner, the seat (3) has no loosend portions nor wrinkles in the bag-like trim cover assembly (1) and also is provided with sufficient close-contact properties with respect to the respective undulated portions of the pad. In FIG. 3, broken lines represent the sitting portion of the seat (3).

As described hereinbefore, according to the invention, it is possible to manufacture a seat by using relatively inexpensive synthetic fibers as its materials as well as by means of knitting. Therefore, the manufacturing method of the invention is quite advantageous in industrial uses.

What is claimed is:

1. A method of manufacturing a seat including a pad and a trim cover assembly covering the pad, comprising the steps of:
    knitting a first kind of synthetic fiber and a second kind of synthetic fiber so as to form a bag-shaped trim cover assembly of a size suitable for covering said pad, said first kind of synthetic fiber having a higher average heat setting temperature than said second kind of synthetic fiber;
    inserting said pad into said bag-shaped trim cover assembly; and
    applying heat and pressure to said trim cover assembly with said pad disposed therein, the heat applied being selected so as to shrink said trim cover assembly in accordance with a shape of said pad.

2. A method as in claim 1, wherein said step of knitting further comprises selecting a first kind of synthetic fiber from the group consisting of acrylic, polyester and nylon and selecting a second kind of synthetic fiber from the group consisting of satin, polypropylene and vinyl chloride.

3. A method as in claim 1, wherein said step of knitting further comprises selecting a first kind of synthetic fiber and a second kind of synthetic fiber such that the difference between a heat setting temperature of said first synthetic fiber and a heat setting temperature of said second synthetic fiber is at least 50° C.

4. A method as in claim 1, wherein said step of knitting comprises knitting a first kind of synthetic fiber and a second kind of synthetic fiber such that the trim cover assembly comprises about 65 to about 95% by weight of said first kind of synthetic fiber.

* * * * *